United States Patent
Twardowska et al.

(10) Patent No.: US 12,152,141 B2
(45) Date of Patent: Nov. 26, 2024

(54) FLAME RESISTANT BODY FILL COMPOSITION

(71) Applicant: Illinois Tool Works Inc., Glenview, IL (US)

(72) Inventors: Helena Twardowska, Glenview, IL (US); Carlton Seaboldt, Glenview, IL (US); Rick Turpin, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 17/467,697

(22) Filed: Sep. 7, 2021

(65) Prior Publication Data
US 2022/0073729 A1    Mar. 10, 2022

Related U.S. Application Data

(60) Provisional application No. 63/075,948, filed on Sep. 9, 2020.

(51) Int. Cl.
| | |
|---|---|
| *C08L 67/02* | (2006.01) |
| *C08K 3/00* | (2018.01) |
| *C08K 3/22* | (2006.01) |
| *C08K 3/34* | (2006.01) |
| *C08K 3/40* | (2006.01) |
| *C08K 5/00* | (2006.01) |
| *C08K 7/20* | (2006.01) |
| *C09J 9/00* | (2006.01) |
| *C09J 11/04* | (2006.01) |
| *C09J 11/06* | (2006.01) |
| *C08K 3/26* | (2006.01) |

(52) U.S. Cl.
CPC ............... *C08L 67/02* (2013.01); *C08K 3/34* (2013.01); *C08K 3/40* (2013.01); *C08K 5/0025* (2013.01); *C08K 7/20* (2013.01); *C09J 11/04* (2013.01); *C09J 11/06* (2013.01); *C08K 2003/2227* (2013.01); *C08K 2003/2241* (2013.01); *C08K 2003/265* (2013.01); *C08K 2201/005* (2013.01)

(58) Field of Classification Search
CPC .... C08L 67/06; C08L 67/02; C08L 2205/025; C08L 2205/03; C08K 3/22; C08K 3/34; C08K 3/40; C08K 5/0025; C08K 7/20; C08K 2003/2227; C08K 2003/2241; C08K 2003/265; C08K 2201/005; C08K 2003/2224; C09J 11/04; C09J 11/06
See application file for complete search history.

(56) References Cited

U.S. PATENT DOCUMENTS

| | | | |
|---|---|---|---|
| 4,336,181 A | 6/1982 | Iseler et al. | |
| 2013/0004663 A1 | 1/2013 | Adams et al. | |
| 2019/0023931 A1* | 1/2019 | Twardowska | ........ C09D 167/08 |

FOREIGN PATENT DOCUMENTS

| | | | |
|---|---|---|---|
| EP | 0052642 A1 | | 6/1982 |
| EP | 3655487 A1 | | 5/2020 |
| JP | 2007077176 A | * | 3/2007 |
| WO | 2019018392 A1 | | 1/2019 |

OTHER PUBLICATIONS

Machine Translation of JP 2007077176 A (Year: 2007).*
Int'l Search Report for PCT/US2021/049341, dated Dec. 3, 2021.

* cited by examiner

*Primary Examiner* — K. Boyle
(74) *Attorney, Agent, or Firm* — MaxGoLaw PLLC

(57) ABSTRACT

A bond fill composition is provided that includes a part A including a curable resin having a degree of unsaturation, an inorganic hydrate filler present in an amount to confer fire suppression time of 60 seconds or less upon cure, and a monomer reactive diluent in which the curable resin is dissolved or suspended. A part B storage-separate, free-radical cure initiator package is provided that includes a free-radical cure initiator. A process for repairing a vehicle body includes mixing the part A with the part B to form a mixture. The mixture is applied to a substrate of the vehicle body in need of repair. Upon curing to form a fill, the vehicle body is repaired and the fill is a sandable surface.

14 Claims, No Drawings

FLAME RESISTANT BODY FILL COMPOSITION

RELATED APPLICATIONS

This application is a non-provisional application that claims priority benefit of U.S. Provisional Application Ser. No. 63/075,948, filed Sep. 9, 2021; the contents of which are hereby incorporated by reference.

FIELD OF THE INVENTION

The present invention in general relates to a curable fill composition and in particular, to such a composition that is flame resistant and in some instances fire retardant.

BACKGROUND OF THE INVENTION

Free radical curable resins have been used in varied applications, such as in polyester vehicle body fill compositions and glass reinforced polyester vehicle body fill compositions used in the automotive body repair field. A common problem encountered in working with such free radical curable resin vehicle body fill compositions is their poor adhesion to various substrates used to form vehicle body panels and other vehicle parts. Another common problem encountered in working with such vehicle body fill compositions is the time-consuming process required to detect low spots or other imperfections on a vehicle body during the fill sanding process.

In the case of hot dipped galvanized substrates, the poor adhesion problem in vehicle body fill compositions presents itself when determining when a cured composition has hardened (or synonymously referred to in the field and herein as having "dried") to an extent needed to allow for sanding of the cured fill composition. While premature attempts to sand a cured partially-hardened composition lead to displacement of curing fill material from a desired location that often requires reapplication of uncured fill composition, waiting too long to assure complete cure to hardness slows repair throughput and can allow for moisture absorption that can negatively affect the longevity of a subsequently applied paint coating through mechanisms such as paint blistering. Furthermore, premature attempts to sand a cured partially-hardened composition result in poor featheredge and clogging of sandpaper. Determining the appropriate time to sand a recently cured fill composition within the desired window of hardness is further complicated by differential rates of cure as a function of variables that illustratively include ambient temperature, quality of polymerization initiator mixing, thickness of the curing composition, and spatial inhomogeneities in cure conditions.

Conventional techniques to control the temporal window for sanding have included the use of heat lamps to speed cure and erring on the side of excess delay. Unfortunately, such lamps are expensive to purchase and operate and still rely on a level of subjective judgment as to when the desired window of sandable hardness has been achieved. At present, dry to sand time is typically determined by a technician who is frequently touching the repair surface and evaluating softness and tackiness of the repair mixture. It is subjective and cumbersome as the composition may stick to the technician's fingers, especially at early stages of cure. As noted above, this may result in displacement of curing fill material from a desired located that often requires reapplication of uncured fill composition, causing the repair process to become more inefficient and time-consuming.

Regarding the detection of low spots or other imperfections during the fill sanding process, conventional techniques generally require a separate step which involves the application of a separate commercial guide coat product on the surface of the repair. This separately added commercial guide coat reveals the presence of any low spots or other imperfections, indicating that further sanding is necessary to remove these low spots or other imperfections.

Body fills are often used in the repair of mass transportation vehicles that carry passengers. Mass transportation vehicles often have safety requirements related to potential fires and flammability of materials used in the vehicle in the case of accidents to provide time for the evacuation of passengers. For example, with respect to fire protection on railway vehicles, the European Union has enacted the EN 45545-2 safety standard. Materials used in rail vehicles must follow the EN 45545-2 standard in order to achieve the highest level of safety possible in the event of a fire. Key parameters that are measured for compliance with the EN 45545-2 standard include flame spread, ignitability, heat release, smoke opacity and toxicity. Having passed the tests, adhesives, sealants, and products for molding and protecting electronics and other structural components are given approval according to EN 45545-2 for use in trains.

Despite the need for flame resistant and fire retardant materials for repair of transportation vehicles, currently available body fill materials typically contain hazardous additives illustratively including antimony oxide, antimony trioxide, and phosphorus compounds that increase smoke toxicity when combusted. Furthermore, the existing fire retardant (FR) commercial body fillers typically have poor application characteristics, such as poor curing properties that result in tacky surface after cure, short working times, sandpaper clogging, and difficult sandability. There is clearly a need for a FR body filler that shows consistently good application performance yet imparts the required flame resistance to a vehicle repair.

Thus, there exists a need for a body fill composition that is amenable to sanding and shows consistently good application performance with low toxicity while imparting flame resistance and/or fire retardancy.

SUMMARY OF THE INVENTION

A bond fill composition is provided that includes a part A including a curable resin having a degree of unsaturation, an inorganic hydrate filler present in an amount to confer fire suppression time of 25 seconds or less upon cure, and a monomer reactive diluent in which the curable resin is dissolved or suspended. A part B storage-separate, free-radical cure initiator package is provided that includes a free-radical cure initiator.

A process for repairing a vehicle body includes mixing the part A with the part B to form a mixture. The mixture is applied to a substrate of the vehicle body in need of repair. Upon curing to form a fill, the vehicle body is repaired, and the fill is a sandable surface.

The cured fill includes a cured polymeric resin matrix containing inorganic hydrate filler present in an amount of from 18 to 62 total weight percent and sandable to a feather edge. The fill is in contact with a vehicle component as a substrate.

DETAILED DESCRIPTION OF THE PREFERRED EMBODIMENTS

The present invention has utility as a body fill that is flame resistant and/or fire retardant with good application characteristics while performing large repairs. An inorganic hydrate filler operative herein includes aluminum trihydrate (ATH); a geologic source thereof, such as gibbsite; huntite (largely $Mg_3Ca(CO_3)_4$); hydromagnesite (largely $Mg_5(CO_3)_4(OH)_2 \cdot 4H_2O$); or combinations thereof. With the proviso that huntite is present in mixtures with hydromagnesite. It is appreciated that the surface energy of the inorganic hydrate filler is reduced by treating the inorganic hydrate filler with a silane to render the filler more compatible with the resin. A silane, if present, is typically present in an amount of from 0.1 to 1 weight percent of the inorganic hydrate filler and if present is included as part of the weight of the hydrate filler. In specific inventive embodiments, the flame resistant and/or fire retardant filler is only alumina trihydrate (ATH). The inorganic hydrate filler releases water of hydration upon heating associated with a fire thereby providing a cooling effect to inhibit combustion. The flame resistance and/or fire retardancy properties of the inventive body filler are formulated for performing large repairs on transportation vehicles, such as trains, trucks, ships, railcars while maintaining fire safety ratings.

Silanes are chemically reactive with both the inorganic hydrate filler and the ethylenically unsaturated resins that upon cure form a polymeric matrix to which the inorganic hydrate filler particles are covalently bonded illustratively include, 3-aminopropyltrimethoxysilane, 3-aminopropyltriethoxysilane, 3-gylcidoxypropyltrimethoxysilane, 3-glycidoxypropyltriethoxysilane, (3-glycidoxypropyl)bis(trimethylsiloxy)methylsilane, (3-glycidoxypropyl)dimethylethoxysilane, (3-glycidoxypropyl)methyldiethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, methacryloxypropylmethyldimethoxysilane, methacryloxypropyltrimethoxysilane; methacryloxypropyltriethoxysilane, 3-methacryloxypropyldimethylchlorosilane, methacryloxypropylmethyldichlorosilane, methacryloxypropyltrichlorosilane, 3-isocyanotopropyldimethylchlorosilane, 3-isocyanatopropyltriethoxysilane, and methacryloxypropyltriethoxysilane, cyclic azasilanes, and combinations thereof.

Generally, silane coupling agents having acryl, amino or glycidyl groups are reactive with a matrix under matrix cure conditions. Silanes containing a silane group are reactive towards hydroxyl groups on the inorganic hydrate filler particles. As such, a silane having a terminal alkyl group upon reaction with the inorganic hydrate filler particle creates a lipophilic surface that is wet by matrix materials but not covalently bonded thereto. Examples of silane coupling agents reactive towards an inorganic hydrate filler particle while unreactive towards a matrix illustratively include propyltrimethoxysilane, propyltriethoxysilane, octyltriethoxysilane, methoxymethyltrimethylsilane, and 3-methoxypropyltrimethoxysilane.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Without intending to be limited to a specific theory, water of hydration is generally released from the inorganic hydrate filler at or above 200° C. during fire. The reaction is endothermic, absorbs heat, and results in a cooling effect to thereby slow the fire. An inorganic hydrate filler is typically present from 18 to 62 total weight percent of the inventive fill composition to provide desired levels of flame resistance and/or fire retardancy to EN 45545-2. The inorganic hydrate filler reduces the amount of smoke generated during fire and does not contribute to smoke toxicity.

In some inventive embodiments of the fill composition, inorganic hydrate filler replaces all of the other minerals typically used in body fill compositions, such as calcium carbonate and talc. In some inventive embodiments, the inorganic hydrate filler is present in the composition in an amount of from 18 to 62 total weight in the composition. Typical sizes of inorganic hydrate filler particles are between 0.1 and 100 microns. In some inventive embodiments, inorganic hydrate filler particles have a median particle size of less than 15 microns. The inorganic hydrate fillers such as ATH have a greater hardness than talc (3 on Mohs scale vs 1 for talc). It has surprisingly been discovered that mere replacement of conventional filler by the inorganic hydrate filler leads to a cured composition that sands poorly and to overcome this problem, the inorganic hydrate filler is combined with lower reactivity unsaturated polyester (UPR) resins which provide low crosslink density and softer polymer, and microspheroid fillers, such as glass or plastic microspheres to ensure good sandability.

In this context, lower reactivity is defined as less cross-linking sites per unit mass of resin. The other important feature of UPR resins operative herein is a good surface cure, as measured by low oxygen inhibition, to ensure tack free surface at the dry to sand time, including UPR resins made with dicyclopentadiene and/or nadic acid. Those resins also provide good flexibility, resulting in less or no cracking during vibrations and temperature fluctuations. The inorganic hydrate filler does not affect cure of UPR resins, resulting in good application performance.

In specific inventive embodiments of the flame resistant and/or fire retardant body inorganic hydrate filler, inhibitors and promoters may be used to control working time. It is appreciated that working time, which is dependent on size of the repair, may be in the range of from 3 to 45 minutes.

Substrates to which an inventive composition are applied illustratively include mild steel, stainless steel, zinc/zinc-aluminum-coated steel, copper, bronze, silicon bronze, tin, aluminum, solder, brass, thermoplastics, and sheet molding compositions. It is appreciated that the present invention is particularly well-suited for the transportation industry.

An inventive polyester resin formulation in certain embodiments is based on a polyester resin; however, it is appreciated that other free radical curable compositions operative herein illustratively include acrylics, vinyl esters, and combinations thereof. The free radical curable resin is modified with specialized additives to control the free-radical polymerization so as to minimize cure reaction exothermocity and shrinkage. To further maximize the resulting cured polyester composite toughness and adhesion, in some inventive embodiments, a thermoplastic filler also incorporated.

As used herein, "sandable" with reference to a cured inventive composition is defined as having limited clogging of sandpaper and able to form featheredge.

As used herein, dry to sand ("DTS") refers to the time following cure initiation at which the fill is sandable.

An inventive unsaturated polyester resin has a degree of ethylenic unsaturation that is between 20 and 40% of the non-alcoholic monomer in the polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether.

An inventive unsaturated polyester is readily formed in a single reaction or in multi-stage reactions. Typical reaction temperatures range from 130-240° C. A conventional esterification catalyst is present and illustratively includes acids, transition metal catalysts and organo-tin compounds. Typical catalyst loadings range from 0.01 to 1 total weight percent of the reactants.

Reactive polyester resins used in inventive composition have a weight average molecular average weight ranging from 5,000 to 600,000. For purposes of calculating monomer percent, reactive diluents are omitted. Specific polyester resin based compositions operative herein are detailed in Table 2.

To form an inventive composition, the resulting reactive polyester resin is dissolved in a reactive diluent. Reactive diluents operative herein include acrylics, acrylates, and methacrylates such as methyl methacrylate, butyl acrylate, ethyl-hexyl acrylate, hydroxypropyl methacrylate, hydroxyethyl methacrylate, lauryl acrylate, stearyl methacrylate, lauryl methacrylate, butanediol diacrylate, ethyleneglycol dimethacrylate, ethyleneglycol-DCPD methacrylate, ethyl (meth)acrylate and n- and isobutyl(meth)acrylate, cyclohexyl(meth)acrylate, isobornyl(meth)acrylate, benzyl(meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl; styrene, α-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

Additives are present in an inventive composition to improve at least one property of handling, storage, cure rate, sandability, or substrate adhesion. The additives illustratively include at least one of a thixotropic agent, a pigment, a dye, a suppressant, a non-hydrate filler, an adhesion promoter, an inhibitor, a leveling agent, or a wetting agent.

A thixotropic agent operative in the present invention illustratively include fumed silica, organoclays, inorganic clays and precipitated silica. Multifunctional alcohols are commonly used to enhance thixotropic properties. A thixotropic agent is present from 0 to 10 percent by weight. The thixotropic agent is typically present from 0.1 to 2 total weight percent of a complete composition for application to a substrate.

A suppressant reduces vapor emissions and in some embodiments enhances cure time. A suppressant operative in the present invention illustratively includes waxes, polyethers, polysiloxanes and various block copolymers. A suppressant is present from 0 to 5 total weight percent of a complete composition for application to a substrate.

Besides inorganic hydrate filler, other filler particulates or fibers are optionally retained in an inventive composition. These fillers include talc, calcium sulfate, calcium carbonate, magnesium sulfate, magnesium carbonate, barium sulfate, and combinations thereof. A ratio of inorganic hydrate filler: other filler is between 3-80:1. It is appreciated that a pigment and non-hydrate filler can have the same function and in those instances where both are present in a composition, the amounts of both are cumulative.

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability, reduce density, and impart softness relative to non-hydrate fillers to compensate for the comparatively higher hardness of the inorganic hydrate filler.

A leveling agent operative in the present invention illustratively includes acrylic resins, fluorocarbons, fluoropolymers and silicones. A leveling agent is present from 0 to 2 total weight percent of a complete composition for application to a substrate.

A wetting agent operative in the present invention illustratively includes boric acid esters, phosphate esters, fatty acid salts, and polyethers. A wetting agent is present from 0 to 2 total weight percent of a complete composition for application to a substrate.

An adhesion promoter operative in the present invention illustratively includes silanes, tetrahydrophthalic anhydride. An adhesion promoter is present from 0 to 2 total weight percent of a complete composition for application to a substrate.

An inhibitor is present to extend shelf storage ability and extend cure time. Cure inhibitors operative herein illustratively include hydroquinone, parabenzoquinone, toluhydroquinone, 4-tert butylcatechol, and metal naphthenates. A cure inhibitor is present from 0.0005 to 1 total weight percent of a complete composition for application to a substrate.

A resin composition is typically stored as a part A that includes all components with the exception of a curative package, and a part B containing a curative package that is mixed with the part A immediately before application to the vehicle body substrate. It is appreciated that other components with the exception of the polyester resin are also present in the curative package.

In some inventive embodiments, at least one color changing dye as detailed in US20190023931A1 is present in the fully mixed uncured composition.

The resin compositions of the present invention are cured to react with the reactive diluent by a number of free-radical cure initiators that include organic peroxide, azo-type initiators, electron beam, ultraviolet (UV) light, and combinations thereof. Peroxide initiators operative herein illustratively include diacylperoxides, hydroperoxides, ketone peroxides, peroxyesters, peroxyketals, dialkyl peroxides, alkyl peresters and percarbonates. Azo-type initiators operative herein illustratively include azobisisobutyronitrile (AIBN). Benzoyl peroxide (BPO) is a prototypical free-radical cure initiator. Chemical cure initiators are typically present from 1 to 5 total weight percent of a fully mixed and applied polyester resin composition. These resin compositions may optionally be cured by UV or electron beam.

It is appreciated that because the cure of a given resin composition varies as a function of variables that illustratively include fill thickness, ambient air temperature, and cure temperature, the dye specifics as to amount and identity will have to be adjusted to coincide with the DTS condition as a function of variables such as those included in the non-exhaustive list above.

Table 1 lists the major components of an embodiment of the inventive curable composition.

TABLE 1

Composition of flame resistant and/or fire retardant curable vehicle body repair composition

| Chemical | Weight % |
|---|---|
| Unsaturated resin | 35-45 |
| Reactive diluent | 3-5 |
| Microspheres | 2-6 |
| Cure initiator (added separately) | 0-2 |
| Additives (e,g thixotropic agent, a pigment, a dye, a suppressant, a non-hydrate filler, an adhesion promoter, an inhibitor, a leveling agent, or a wetting agent_ | each 0-5 |
| Fillers/pigments | Remainder such as: |
| Pigment: TiO$_2$ | 0-6.0 |
| Inorganic hydrate | 18-62 |
| Non-hydrate filler(s) | 1.25 to 33% of amount of inorganic hydrate |

The present invention is further described with respect to the following non-limiting examples. These examples are intended to illustrate specific compositions according to the present invention and should not be construed as a limitation as to the scope of the present invention.

EXAMPLES

Examples 1-5

Specimen samples were prepared as follows: fills were mixed with 2 wt % benzoyl peroxide paste (50% BPO) as a cure initiator, applied on 6×12" aluminum panels, allowed to cure completely and then sanded to thickness of 30 mils as even as possible. Samples were stored at ambient conditions for two weeks to make sure cure was complete.

The sample specimens were then tested for the flame spread using simple test developed in the lab to compare burn time of various compositions. It was previously determined that results of this test correlate well with flammability tests conducted in accordance with ISO 5658-2 and EN 45545 for flame spread, smoke density and toxicity testing.

A test specimen was placed in a vertical position, contacted with flame from the pentane burner for 45 seconds and the burn time was measured from the moment of removing flame until burning was extinguished by itself.

As shown in Table 2 all fills containing ATH as an inorganic hydrate filler show good application performance and, in some cases, match performance of the control. The Control is a currently available excellent commercial fill. Inorganic hydrate fillers can be formulated to achieve different working times, 4-30 minutes, depending on specific applications. Use of ATH can be combined with fire retardant UPR resins to meet even more stringent flammability requirements.

All body fills containing ATH burned for a very short time, less than 30 seconds, and then fire was self-extinguished. The Comparative example, a currently available excellent commercial fill, continued burning for over 2 minutes and then was externally extinguished.

The compositions, typical properties, and fire retarding results are shown in Table 2 based on polyester resins and ATH.

TABLE 2

Composition and properties of fire retardant body fill compositions for Examples 1-5 (EX1-EX5) relative to a comparative example.

| | Comparative | EX1 | EX2 | EX3 | EX4 | EX5 |
|---|---|---|---|---|---|---|
| Component (wt %) | | | | | | |
| UPR RESIN1 | 27.11 | 23.6 | 9.4 | 9.4 | 8.91 | 10.2 |
| UPR RESIN2 | 10.49 | 9.14 | 26.5 | 26.5 | 26.04 | 28.27 |
| UPR RESIN3 | 8.63 | 7.54 | | | 4.88 | 1.59 |
| STYRENE | 3.1 | 2.75 | 1.2 | 1.2 | 2.2 | 2.2 |
| CURE ACCELERATOR | 0.04 | 0.04 | 0.03 | 0.03 | 0.03 | 0.03 |
| INHIBITOR | | | 0.03 | 0.03 | 0.08 | 0.09 |
| DISPERSANT | 0.51 | 0.51 | 0.44 | 0.44 | 0.46 | 0.46 |
| PARAFFIN WAX | 0.13 | 0.13 | 0.13 | 0.13 | 0.13 | 0.13 |
| RHEOLOGY ADDITIVE1 | 0.62 | 0.62 | 0.34 | 0.34 | 0.49 | 0.49 |
| RHEOLOGY ADDITIVE2 | | | | | 0.57 | 0.57 |
| ADHESION PROMOTER | 0.54 | 0.54 | 0.51 | 0.51 | 0.54 | 0.54 |
| TiO2 PIGMENT | 0.99 | 0.99 | 0.92 | 0.92 | 0.98 | 0.98 |
| CALCIUM CARBONATE | 11.13 | | | | | |
| ALUMINUM TRIHYDRATE | | 42.03 | 19.2 | 35 | 41.75 | 41.51 |
| TALC 1 | 6.98 | 5.44 | | | 6.1 | 6.1 |
| TALC 2 | 22.25 | 2.47 | 41.36 | 27.35 | 2.44 | 2.44 |
| GLASS MICROSPHERES | 7.48 | 4.2 | | | 4.4 | 4.4 |
| Total, % | 100 | 100 | 100 | 100 | 100 | 100 |
| VISCOSITY at 77 F, cP | 90,000 | 95,000 | 97,000 | 96,000 | 97,000 | 97,500 |
| GEL TIME (minutes) 77 F | 4.1 | 5.1 | 9.1 | 9.1 | 28.2 | 30.5 |

TABLE 2-continued

Composition and properties of fire retardant body fill compositions for
Examples 1-5 (EX1-EX5) relative to a comparative example.

|  | Comparative | EX1 | EX2 | EX3 | EX4 | EX5 |
|---|---|---|---|---|---|---|
| DENSITY (lb/gallon) | 9.1 | 10.8 | 13.8 | 13.9 | 11.1 | 10.9 |
| BURN TIME (seconds) | <120 | 8 | 25 | 10 | 7 | 6 | where:
UPR Resin1—ethylene/propylene glycol, maleic anhydride/dicyclopentadiene, soy oil, medium reactivity. Provides good sandability.
UPR Resin2—ethylene/diethylene glycol, maleic anhydride/fumaric acid/nadic acid, low reactivity. Provides good surface cure and sandability.
UPR Resin3—diethylene glycol phthalic anhydride, low reactivity. Provides good flexibility and reduces cracking.
Talc 1-5 micron average diameter
Talc 2-10 micron average diameter
Burn time measured per ASTM D3801-20.

Example 6

Application performance for the fill compositions of Examples 1-5 were determined, where the fills were cured with 2 total weight percent benzoyl peroxide paste (50% BPO) and applied on steel substrates as described in Examples 1-5. Samples where tested at 69° F. (20.5° C.) at a relative humidity of 57%. Performance attributes of the inventive body fill composition examined included mix and feel, work time (minutes), dry to sand (minutes), surface clogging, sand quality below surface, featheredge quality, adhesion, and spreader hang. Performance attributes were graded on scale 1-10, with 1 being worst and 10 being best. Table 3 summarizes the performance results for the fill compositions of Examples 1-5.

TABLE 3

Application performance of the fire retardant fill compositions of Table 2.

| Temperture 69° F. (20.5° C.) Humidity 57% | Mix and Feel | Work Time (min) | Dry to Sand (min) | Surface Clogging | Sand Quality Below Surface | Featheredge Quality | Adhesion | Spreader Hang |
|---|---|---|---|---|---|---|---|---|
| 2% BPO Substrate Steel | | | | | | | | |
| Comparative | 8.5 | 4.5 | 20 | 8 | 9 | 9 | 9 | 8 |
| EX1 | 8.5 | 5 | 25 | 8.5 | 8.5 | 8 | 9 | 8.5 |
| EX2 | 6.5 | 11 | 30 | 7.5 | 6.5 | 7 | 9 | 7 |
| EX3 | 8 | 8.5 | 30 | 8.5 | 6 | 7 | 9 | 7 |
| EX4 | 8 | 30 | 120 | 8.5 | 7.5 | 8 | 9 | 8.5 |
| EX5 | 8 | 32 | 120 | 8.5 | 7.5 | 7 | 9 | 8 |

As a person skilled in the art will recognize from the previous detailed description and from the figures and claims, modifications and changes can be made to the preferred embodiments of the invention without departing from the scope of this invention defined in the following claims.

The invention claimed is:

1. A bond fill composition comprising:
   a part A comprising a curable unsaturated polyester (UPR) resin having a degree of unsaturation and based on dicyclopentadiene, nadic acid, or a combination thereof,
   an inorganic hydrate filler present in an amount from 18 to 62 total weight percent of said composition to confer fire suppression time of 60 seconds or less upon cure,
   a suppressant present from 1 to 5 total weight percent of said composition, and microspheroid fillers having a longest linear dimension of between 20 and 100 microns,
   wherein said inorganic hydrate filler is selected from the group consisting of aluminum trihydrate, gibbsite, huntite ($Mg_3Ca(CO_3)_4$), hydromagnesite ($Mg_5(CO_3)_4(OH)_2 \cdot 4H_2O$), or combinations thereof, said inorganic hydrate filler having a median particle size of less than 15 microns, and
   a monomer reactive diluent in which said curable resin is dissolved or suspended;
   wherein said suppressant is selected from a group consisting of waxes, polyethers, polysiloxanes and block copolymers; and
   a part B storage-separate, free-radical cure initiator package comprising a free-radical cure initiator;
   wherein upon combination and cure, said composition is sandable to a feather edge.

2. The composition of claim 1 wherein said UPR is derived from ethylene or propylene glycol, maleic anhydride, dicyclopentadiene, and soy oil.

3. The composition of claim 1 wherein said UPR further is derived from ethylene or diethylene glycol, maleic anhydride, fumaric acid, and nadic acid.

4. The composition of claim 1 wherein said UPR is further derived from diethylene glycol with isophthalic anhydride, and/or maleic anhydride.

5. The composition of claim 1 further comprising inhibitors and promoters.

6. The composition of claim 1 wherein said microspheroid fillers are glass microspheres or plastic microspheres.

7. The composition of claim 1 further comprising a silane present in an amount of from 0.1 to 1 weight percent on a surface of said inorganic hydrate filler.

8. A process for repairing a vehicle body comprising:
mixing the part A with a part B of claim 1 to form a mixture;
applying said mixture to a substrate of the vehicle body; and
curing said mixture to form a fill.

9. The process of claim 8 wherein said curing occurs within 30 minutes of forming said mixture.

10. The process of claim 8 further comprising sanding said fill.

11. The process of claim 8 wherein said substrate comprises mild steel, stainless steel, zinc coated steel, zinc-aluminum-coated steel, copper, bronze, silicon bronze, tin, aluminum, solder, brass, thermoplastics, or sheet molding compositions.

12. The process of claim 8 wherein said fill has a feature edge and a central region.

13. The process of claim 8 further comprising subjecting said fill to a burn test with a burn time of 25 seconds or less.

14. A cured fill comprising:
a cured polymeric resin matrix formed from the composition of claim 1, said cured fill is in contact with a vehicle component as a substrate.

\* \* \* \* \*